US011953108B1

(12) United States Patent
Moon et al.

(10) Patent No.: US 11,953,108 B1
(45) Date of Patent: Apr. 9, 2024

(54) UNLOADING VALVE ASSEMBLY FOR COMPRESSED AIR PROCESSING SYSTEM IN A COMMERCIAL VEHICLE

(71) Applicant: SEMYUNGTECH CO., LTD., Seoul (KR)

(72) Inventors: Seong-won Moon, Asan-si (KR); Sang-sun Park, Iksan-si (KR)

(73) Assignee: SEMYUNGTECH CO., LTD., Seoul (KR)

( * ) Notice: Subject to any disclaimer, the term of this patent is extended or adjusted under 35 U.S.C. 154(b) by 0 days.

(21) Appl. No.: 18/088,775

(22) Filed: Dec. 27, 2022

(51) Int. Cl.
*F15B 13/02* (2006.01)
*F15B 11/06* (2006.01)
*F15B 13/04* (2006.01)
*F16K 15/06* (2006.01)
*F16K 15/18* (2006.01)
*F16K 31/122* (2006.01)
*F16K 31/124* (2006.01)

(52) U.S. Cl.
CPC ............ *F16K 15/184* (2021.08); *F15B 13/02* (2013.01); *F15B 13/0401* (2013.01); *F16K 15/063* (2013.01); *F16K 31/1221* (2013.01); *F16K 31/1245* (2013.01); *F15B 2211/50536* (2013.01)

(58) Field of Classification Search
CPC .. F16K 15/184; F16K 15/063; F16K 31/1221; F16K 31/1223; F16K 31/124; F15B 13/0401; F15B 13/02; F15B 13/022; F15B 21/041; F15B 2211/615; F15B 2211/8855; F15B 2211/50536; F15B 2211/526; F15B 2211/40507; F15B 11/06; F15B 11/024; B60G 13/10; B60G 2300/02; B60G 2300/14; B60T 17/002
See application file for complete search history.

(56) References Cited

U.S. PATENT DOCUMENTS

2020/0056634 A1\* 2/2020 Bell ...................... F16K 15/044
2022/0194342 A1\* 6/2022 Moon .................... B60G 13/10

FOREIGN PATENT DOCUMENTS

| JP | 2562919 Y2 | 2/1998 |
| JP | 3425476 B2 | 7/2003 |
| KR | 10-1042765 B1 | 6/2011 |
| KR | 10-1793892 B1 | 11/2017 |
| KR | 10-2054167 B1 | 12/2019 |
| KR | 102248426 B1 \* | 5/2021 |
| KR | 10-2406046 B1 | 6/2022 |
| KR | 10-2441789 B1 | 9/2022 |

\* cited by examiner

*Primary Examiner* — Marina A Tietjen
(74) *Attorney, Agent, or Firm* — Revolution IP, PLLC

(57) ABSTRACT

The present invention provides an unloading valve assembly that configures a compression area divided for each control input and opens a valve seat by a pressurizing rod of a piston that performs pressurization by a control input, thereby quickly and accurately exhausting compressed air through the unloading valve assembly and improving durability when closing the valve.

11 Claims, 6 Drawing Sheets

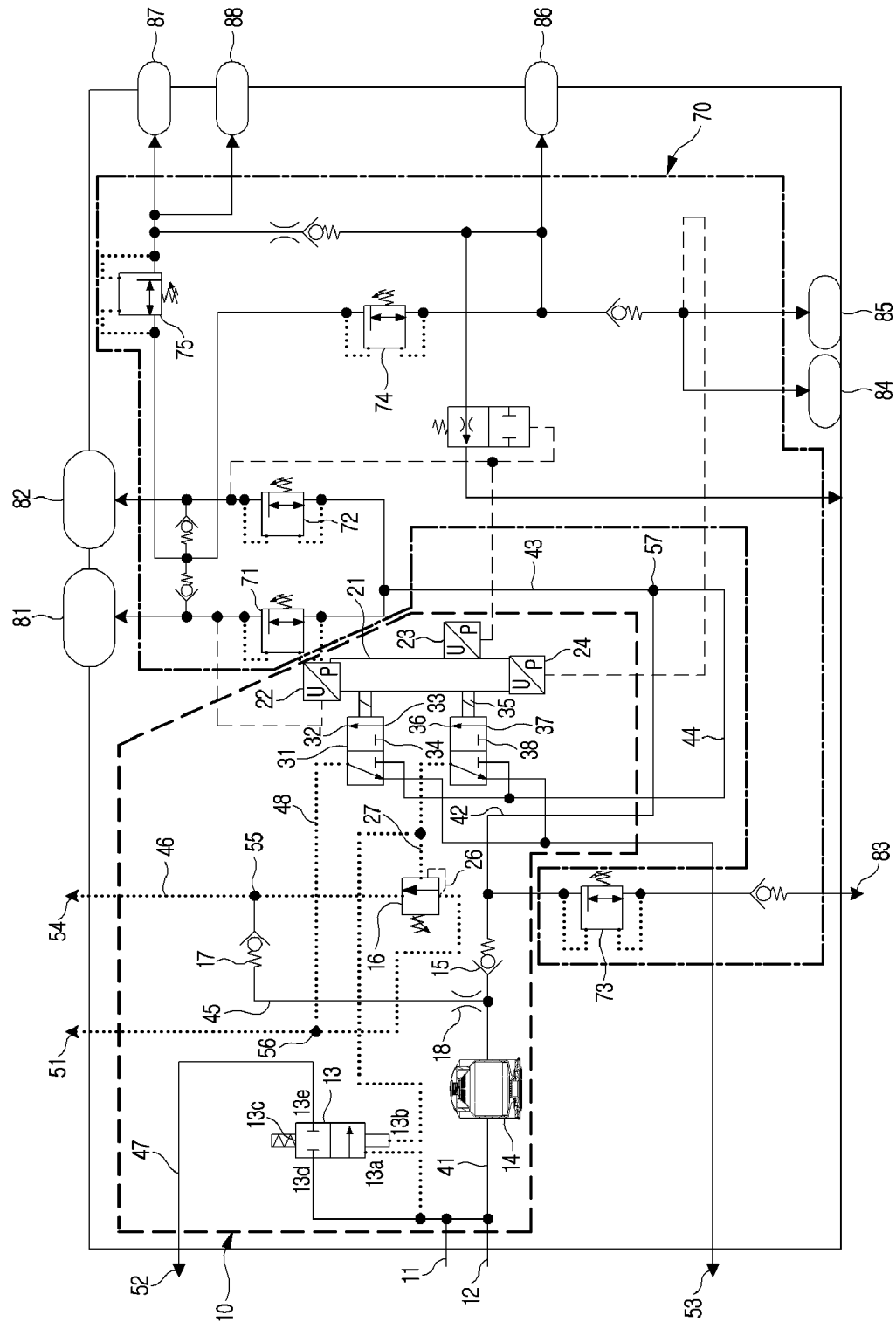
[FIG. 1]

[FIG. 2]
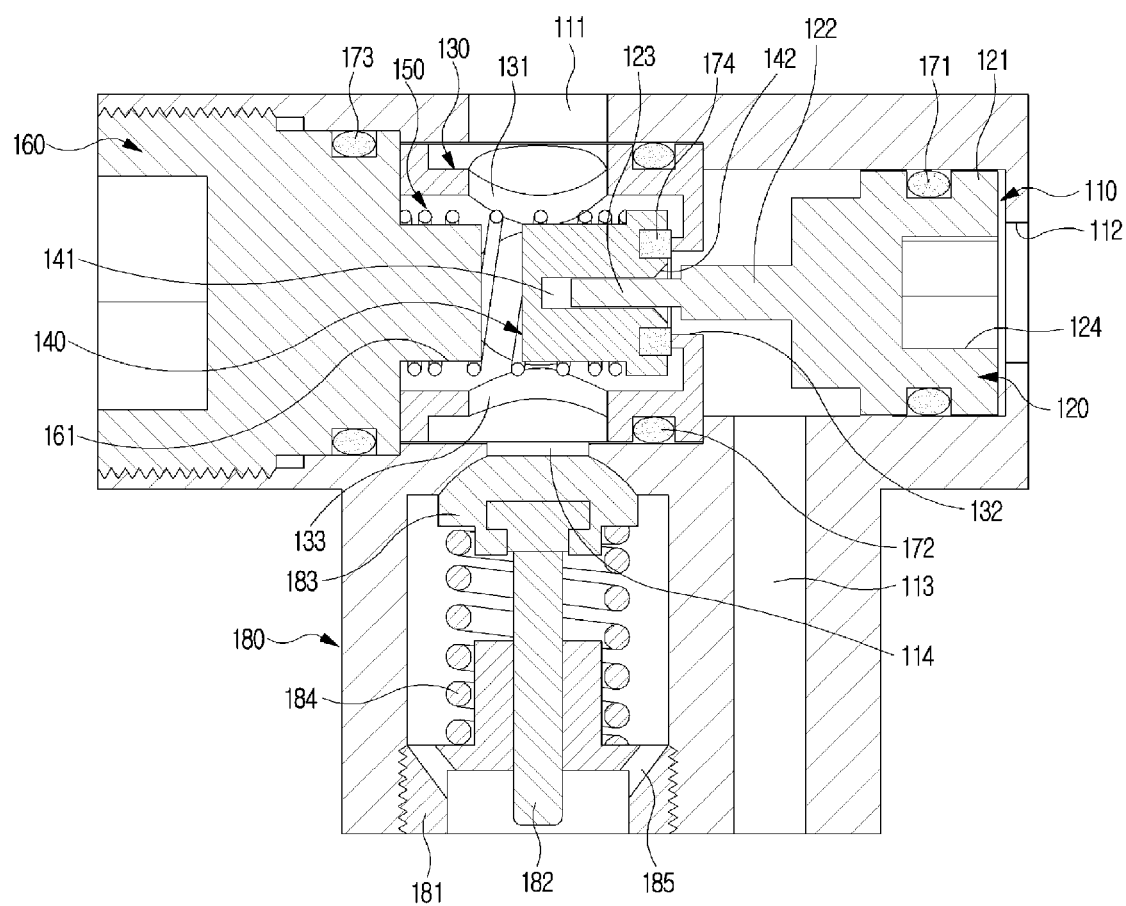

[FIG. 3]
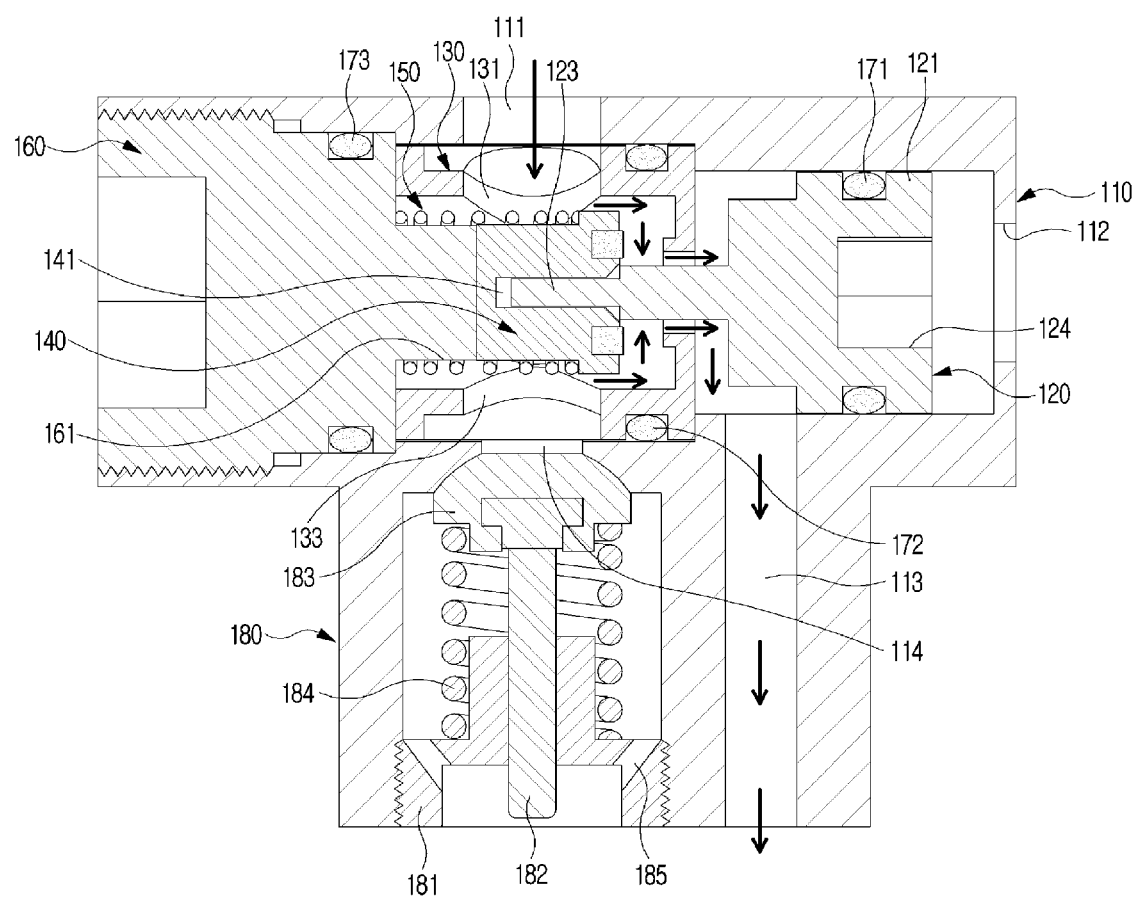

[FIG. 4]
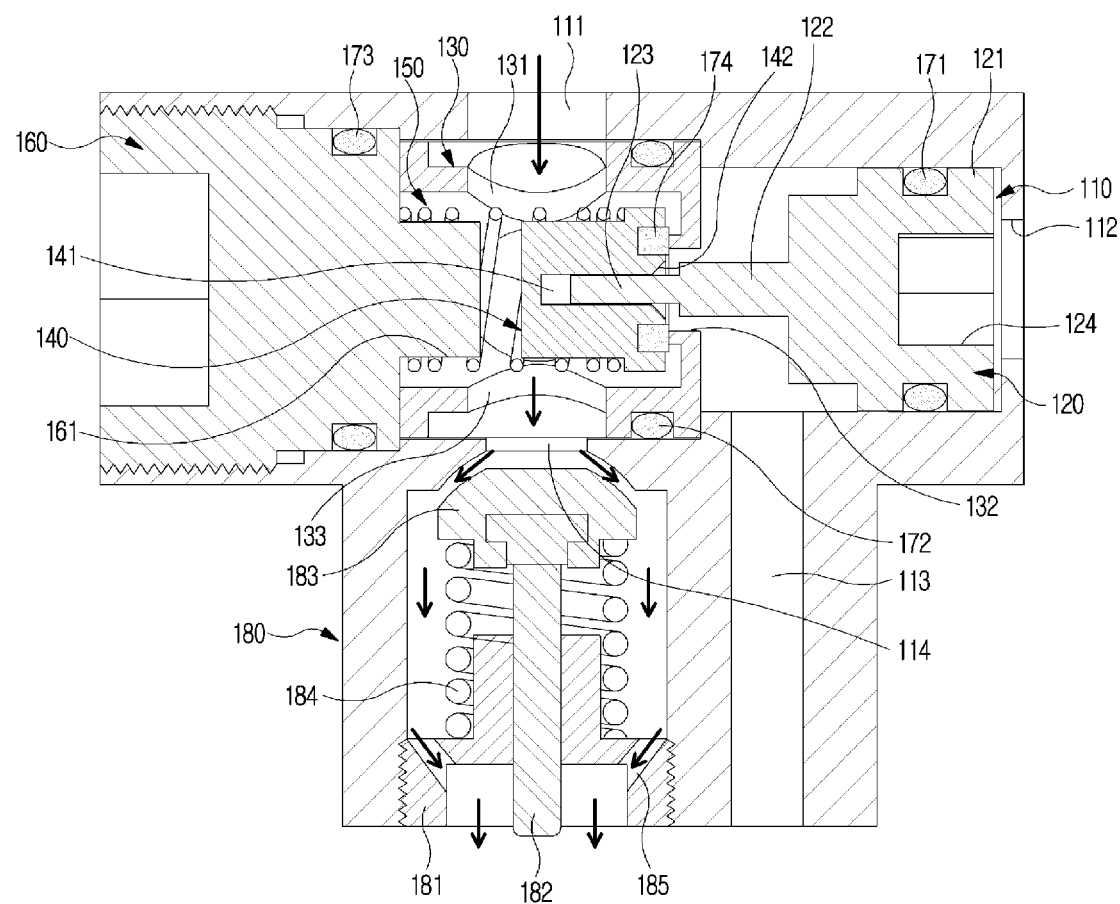

[FIG. 5]
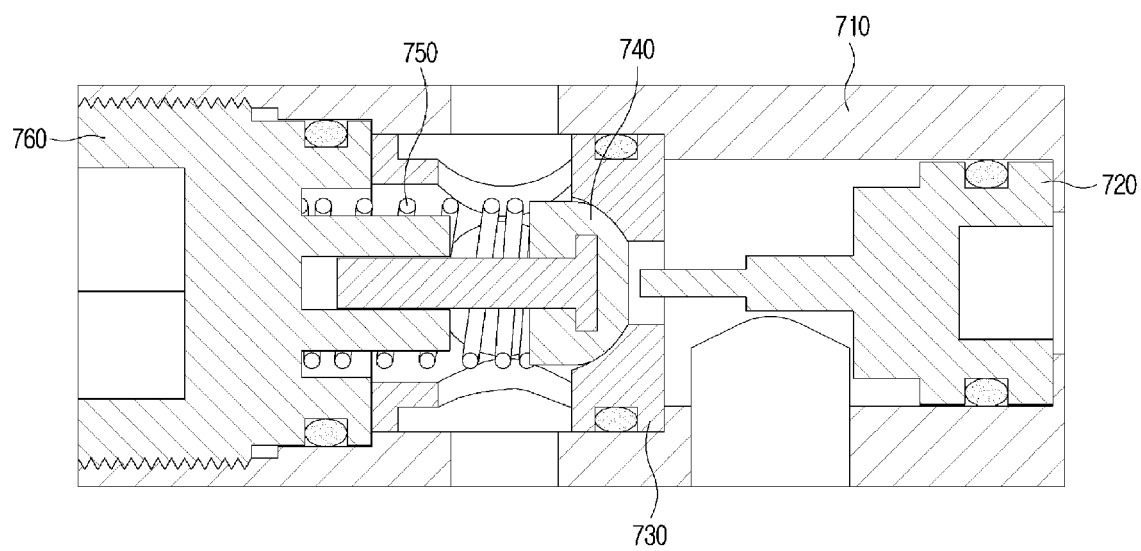

[FIG. 6]
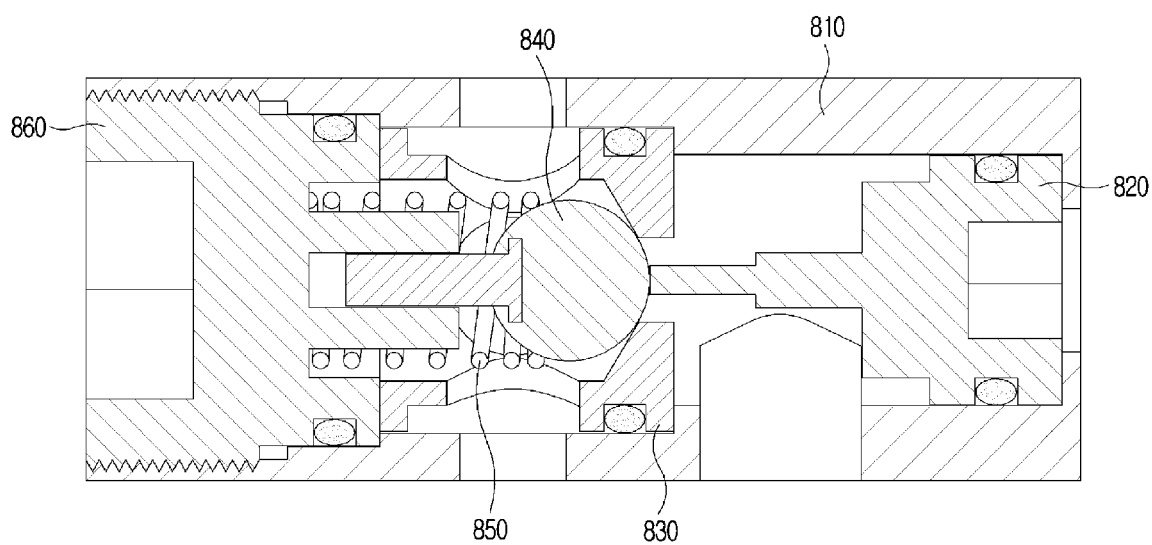

UNLOADING VALVE ASSEMBLY FOR COMPRESSED AIR PROCESSING SYSTEM IN A COMMERCIAL VEHICLE

TECHNICAL FIELD

The present disclosure relates to an unloading valve assembly for compressed air processing system in a commercial vehicle and, more particularly, to an unloading valve assembly installed in a compressed air processing device that processes and supplies compressed air, which is used for a braking system and suspension system, etc. of commercial vehicle, and that regenerates an air dryer by flowing the compressed air backward.

BACKGROUND ART

Commercial vehicles are equipped with various operation systems that use air pressure to control the operation of the large and heavy commercial vehicles. For example, a service brake system, a pneumatic suspension system, a parking brake system, etc. are such pneumatic systems. Compressed air at high pressure is required to drive such pneumatic systems. Such compressed air is produced through a compressor, which is driven by an engine or a driving motor, and then sent to the reservoirs of systems that use the compressed air.

The compressed air that is supplied through a compressor contains foreign substances including oil and water. Such foreign substances such as oil and water in compressed air have a bad influence on systems such as causing breakdown or deteriorating durability of pneumatic systems.

In order to remove oil, water, etc. contained in compressed air, a dryer unit including a filter cartridge filled with a drying agent is included in a compressed air processing system. Such a dryer unit is installed on a supply line of compressed air to discharge dry and clean air to each system by not only filtering out oil, but removing water contained in compressed air flowing from a compressor.

The compressed air processing efficiency in the filter cartridge decreases over time, and there is a need for a regeneration process that sends compressed air processed already, backward to improve the efficiency of the filter cartridge, particularly, the water removal efficiency of the drying agent. Compressed air that has been processed already flows back to the filter cartridge and water and foreign substances existing in the filter cartridge are discharged outside through this regeneration process.

Various valves installed in channels are controlled when processes of supplying and regenerating compressed air are performed, whereby the process of supplying or regenerating compressed air is selectively performed.

The recent trend of the automobile industry is focused on improvement of fuel efficiency through light-weighting, optimal control, etc., and particularly, commercial vehicles are gradually increasing in size due to price competition of product transportation, so a technology for improve energy efficiency is necessarily required. As a part, technologies of enabling an ECU to electronically control a system under optimal conditions for air supply on the basis of vehicle information received through vehicle communication are applied.

In such an electronically controlled compressed air processing device, a technology for preventing the driving efficiency of the compressor and unnecessary air containing foreign substances is discharged through the unloading valve of the compressed air treatment device, water is condensed at the outlet side or emulsion is accumulated due to a mixture with oil, which causes a failure of the compressed air processing device. Therefore, an unloading valve assembly with improved discharge performance is required.3In addition, it is necessary to improve valve durability due to the problem that the valve is damaged early due to repeated unloading valve opening and closing operation.

DISCLOSURE

Technical Problem

The present disclosure has been made in an effort to solve the above-mentioned problems, and aspects of the present disclosure provide an unloading valve effectively operable to open and close control of a solenoid valve in configuring a compressed air processing system that can effectively control supply and regenerating operations of compressed air of the compressed air processing system by an electronic control device.

Specifically, aspects of the present disclosure also improve valve durability by reducing a force applied to a valve seat surface when the valve is opened and closed, by reducing the force required to open the valve and reducing a spring coefficient of an inner spring member.

In addition, aspects of the present disclosure also provide an unload valve assembly that can reduce the risk of valve damage by properly discharging high-pressure compressed air at the time of the occurrence of overpressure in the valve.

In addition, aspects of the present disclosure also maximize the regeneration efficiency of the system by minimizing the amount of compressed air discharged to an outlet connected to the unloading valve.

In addition, aspects of the present disclosure also improve regeneration efficiency and improve the durability of the unloading valve by configuring the unloading valve to be pre-opened before compressed air enters a filter cartridge through a regeneration line.

Technical Solution

In order to achieve the objectives, a preferred embodiment of the present disclosure provides an unloading valve assembly for compressed air processing system in a commercial vehicle, comprising: a valve body having an inner space extending in an axial direction, and including a first inlet through which a first control input of compressed air is introduced according to an operation of a first control valve, a second inlet through which a second control input of compressed air is introduced according to an operation of a second control valve, and a main outlet through which the compressed air of the inner space can be discharged to the outside; a piston inserted into the inner space of the valve body and configured to communicate with the second inlet to be axially movable by the second control input; a hollow adapter inserted into the inner space of the valve body, including a first opening communicating with the first inlet and a second opening through which a part of the piston can pass, and having a valve seat settling surface formed thereon; a valve seat in close contact with the valve seat settling surface of the hollow adapter and installed to open the second opening of the hollow adapter while being pressurized by the piston and moving in the axial direction; a cover fixed to the valve body; and a first spring member compressibly installed between the cover and the valve seat.

Further, The unloading valve assembly for compressed air processing system in a commercial vehicle of claim 1, wherein the piston may includes: a piston head configured to receive a second control input by compressed air introduced from the second inlet; and a pressurizing rod extending from the piston head in the axial direction and having an outer diameter smaller than that of the piston head.

The piston head may be provided with a pressurizing groove communicating with the second inlet, and when the piston retracts in the axial direction as the second control input is applied to the pressurizing groove, the valve seat may be pressurized to open the second opening of the hollow adapter, and the compressed air introduced into the inner space of the valve seat through the first inlet may be discharged to the main outlet.

The cover may further include a stopper into which the first spring member is inserted and which protrudes toward the valve seat so as to limit the amount of retreat of the valve seat.

The inner space of the valve body may have a multi-stepped structure with a step part, and the hollow adapter may be fixed between the cover and the step part of the valve body.

The piston may further include a guide pin extending in the axial direction from the pressurizing rod, and the valve seat may have a guide groove formed to guide the guide pin.

The valve body may be provided with a bypass outlet through which compressed air introduced into the first inlet can be discharged without passing through the main outlet, the hollow adapter may have a third opening formed to communicate with the bypass outlet, and a safety valve may be further installed to open and close the bypass outlet.

The safety valve may include: a safety valve seat capable of blocking the bypass outlet; a safety valve shaft connected to the safety valve seat; a pressurizing socket fixedly mounted in the valve body, configured to guide the safety valve shaft, and having an exhaust port formed therein; and a second spring member compressibly installed between the pressurizing socket and the safety valve seat, wherein the safety valve is opened when the pressure in the inner space of the valve body exceeds a preset reference pressure.

The valve seat includes a main valve shaft and a seat portion having a rounded seat surface fixed and mounted on the main valve shaft, a stopper having a groove formed to guide the main valve shaft is formed in the cover, and the valve seat settling surface of the hollow adapter is rounded along the seat surface.

The seat portion may include: a first support surface configured to support the first spring member; a second support surface which can be pressurized against the piston; and a rounded seat surface connected from the first support surface to the second support surface.

The seat portion may be a spherical seat portion.

Advantageous Effects

According to a preferred embodiment of the present disclosure, in the compressed air processing system to which an unloading valve assembly according to an embodiment of the present disclosure is applied, while the pressure to a regeneration sequence valve installed on a regeneration line is increased above a switching pressure through the switching control of an electronically controlled valve, the unloading valve is rapidly opened by the control input in this process, and accordingly, the regeneration efficiency can be improved by delaying the opening time of the regeneration line as compared to the unloading of a compressor.

In particular, according to the present disclosure, a spring coefficient of a spring member applied to the unloading valve assembly can be set small by adopting a structure that can open the valve with a relatively small force, thereby greatly improving valve durability by reducing the force repeatedly acting inside the valve assembly when a valve is opened and closed.

In addition, in the case of the unloading valve assembly for a compressed air processing system in a commercial vehicle according to the present disclosure, the operability is improved by compressed air, thereby improving the efficiency of the unloading valve assembly.

In addition, the present disclosure has the effect of reducing the risk of valve damage by properly discharging high-pressure compressed air when overpressure occurs inside the valve.

In addition, according to a preferred embodiment of the present disclosure, a compressed air processing system including an unloading valve assembly capable of opening an unloading valve before opening a regeneration line can be implemented to prevent overpressure from occurring in a compressed air supply line. Furthermore, it is possible to improve the problem of poor initial regeneration efficiency due to high-pressure compressed air remaining on the compressed air supply line during regeneration.

In addition, according to the present disclosure, since the unloading valve is opened in advance before regeneration is completely initiated, the impact applied to the unloading valve at the beginning of regeneration can be reduced to improve the durability of the unloading valve.

DESCRIPTION OF DRAWINGS

FIG. 1 shows an example of a compressed air processing system to which an unloading valve assembly according to the present disclosure is applied.

FIGS. 2 to 4 are cross-sectional views of the unloading valve assembly according to a preferred embodiment of the present disclosure, FIG. 2 shows a closed state of the unloading valve assembly, FIG. 3 shows an open state of the unloading valve assembly opened by the valve control, and FIG. 4 shows a state in which the safety valve is opened when an inner pressure of the valve assembly increase above a reference pressure.

FIG. 5 is a cross-sectional view of an unloading valve assembly according to another embodiment of the present disclosure.

FIG. 6 is a cross-sectional view of an unloading valve assembly according to another embodiment of the present disclosure.

BEST MODE

In order to the objects, a preferred embodiment of the present disclosure provides an unloading valve assembly for compressed air processing system in a commercial vehicle, comprising: a valve body having an inner space extending in an axial direction, and including a first inlet through which a first control input of compressed air is introduced according to an operation of a first control valve, a second inlet through which a second control input of compressed air is introduced according to an operation of a second control valve, and a main outlet through which the compressed air of the inner space can be discharged to the outside; a piston inserted into the inner space of the valve body and configured to communicate with the second inlet to be axially movable by the second control input; a hollow adapter inserted into the inner space of the valve body, including a first opening communicating with the first inlet and a second opening through which a part of the piston can pass, and having a valve seat settling surface formed thereon; a valve seat in close contact with the valve seat settling surface of the hollow adapter and installed to open the second opening of the hollow adapter while being pressurized by the piston and moving in the axial direction; a cover fixed to the valve body; and a first spring member compressibly installed between the cover and the valve seat.

MODE FOR INVENTION

A compressed air processing system according to preferred embodiments of the present disclosure is described hereafter with reference to the accompanying drawings.

Embodiments to be described hereafter are provided only for detailed description for those skilled in the art to be able to easily achieve the present disclosure without limiting the protective range of the present disclosure. Accordingly, some components may be substituted or changed without departing from the necessary range of the present disclosure.

When a component is 'connected' with another component in the following description, it includes not only direct connection of them, but connection of them with another element or device therebetween. Further, unless explicitly described otherwise, 'comprising' any components will be understood to imply the inclusion of other components rather than the exclusion of any other components.

A compressed air processing system that is described herein, similar to the existing systems, includes a filter cartridge for removing oil, water, etc. contained in compressed air that is supplied from a compressor. The expression that compressed air is 'processed' herein means that oil, water, and foreign substances in compressed air are filtered out while the compressed air passes through the filter cartridge.

The compressed air processing system that is described herein is configured such that compressed air processed through a filter can be supplied in one direction and compressed air processed already under predetermined conditions are sent back to be regenerated in opposite direction.

A supply step stated herein means a process of processing air compressed by a compressor through the filter cartridge and then supplying the compressed air to a compressed air consumption system, and a regeneration step means a process of regeneration the inside of the filter cartridge by sending compressed air processed already back to the filter cartridge.

FIG. 1 shows a compressed air processing apparatus according to a first embodiment of the present disclosure.

The compressed air processing system 1 with an unloading valve assembly according to a preferred embodiment of the present disclosure includes a dryer unit 10 and a valve assembly 70. The part indicated by a dashed line at the left side in FIG. 1 shows the dryer unit 10 that is supplied with compressed air from a compressor, dries the compressed air through a filter cartridge 14, and then supplies the compressed air to the valve assembly 70. Further, the compressed air processing system 1, as shown at the other side, that is, the part indicated by a dashed dotted line in FIG. 1, may be configured to a valve assembly 70 including valves that supply compressed air from a downstream side of a first supply line 43 to each compressed air consumption system at a divergence point 57.

As shown in FIG. 1, the compressed air processing system according to a preferred embodiment of the present disclosure is configured to be able to process compressed air, which flows through a compressed air inlet connected to a compressor (not shown), through the filter cartridge 14 and then to supply the processed air to a valve assembly 70 connected to each compressed air consumption system.

The compressor not shown is an apparatus that suctions, compresses, and then discharges surrounding air, and the compressed air inlet is an intake port for transmitting the compressed air discharged from the compressor to the compressed air processing system according to the present disclosure. Further, as shown in FIG. 1, another supplementary compressed air inlet 12 may be included other than the compressed air inlet 11, and a supplementary compressed air inlet 12 may be used to supply compressed air produced by another compressed air source at the outside into the system other than the purposes of vehicle maintenance, etc.

The compressed air supplied through the compressed air inlet 11 can be supplied to the filter cartridge 14 through a compressed air supply line 41. The filter cartridge 14 is a filter structure including a drying agent, a drying agent for securing dehumidifying performance is received in the cartridge, and an oil absorption filter is disposed at the compressed air inlet to be able to remove oil.

Accordingly, the compressed air supplied through the compressed air inlet 11 is processed while passing through the filter cartridge 14. The processed compressed air can be supplied to a main supply line 42 at the center through a main check valve 15. The main check valve 15 is provided to prevent the processed compressed air existing in the main supply line 42 at the center from flowing back to the filter cartridge 14.

The main supply line at the center includes a divergence point 57, and a first supply line 43 for supplying compressed air to the valve assembly 70 connected to consumption systems and a second supply line 44 connected to an electronic control valve for regeneration control are connected to the divergence point 57.

Several consumption systems are connected to the first supply line 43. For example, as shown in FIG. 1, such consumption systems may be first and second brake systems 81 and 82, a parking brake system 84, an air suspension system 83, a trailer supply system 85, and an assistant supply system 86. Overflow valves 71, 72, 73, 74, and 75 for protecting circuits may be installed in the channels connected to the systems, respectively. The overflow valves 71, 72, 73, 74, and 75 have opening pressure set to open the channels, and can apply pressure to the systems, respectively, when the predetermined opening pressures are exceeded.

The opening pressures of the valves 71, 72, 73, 74, and 75 connected to circuits, respectively, are set on the basis of the priorities of the consumption circuits. Preferably, the opening pressures of the overflow valves 71 and 72 for the service brake system are set lowest so that compressed air can be supplied first to the service brake. Accordingly, when compressed air is sufficiently supplied to the service brake and the pressure in the line is increased, the overflow valves are sequentially opened in accordance with the opening pressures thereof and compressed air can be supplied to the consumption circuit. Further, check valves for preventing backflow may be installed in the valve assembly 70.

Meanwhile, the second supply line 44 corresponds to a supply line of compressed air for a regeneration process. The compressed air passing through the second supply line 44 may be used as control input for regeneration control and may be used as compressed air for regeneration that is supplied to the filter cartridge 14 through the regeneration line 45. The regeneration line 45 refers to the line between the divergence point 55 and the filter cartridge 14.

To this end, the compressed air processing system according to the present disclosure includes two electronic control valves and includes an electronic control unit 21 for electronically controlling the electronic control valves. The electronic control unit 21 can be electrically connected with another controller, sensors, or the like in a vehicle, and preferably, and is configured to be able to receive various items of state information of the vehicle in real time from the controller, sensors, of the like. For example, as in FIG. 1, the electronic control unit 21 may be connected to pressure sensors 22, 23, and 24 for measuring pressure at specific positions in the compressed air processing system. Further, the electronic control unit 21 is configured to be able to control switching of the electronic control valves in accordance with the state information of the vehicle received from another controller, sensors such as a pressure sensor, or the like.

The electronic control valves can selectively control a supplying mode and a regeneration mode, so, in the present disclosure, it is possible to selectively perform a supplying step or a regeneration step on the basis of the current state of the vehicle through the electronic control unit 21.

The two electronic control valves may be solenoid valves that are electrically operated and they are referred to as a first electronic control valve 31 and a second electronic control valve 35 herein. The two electronic control valves both can be used to perform the regeneration step, and preferably, switching the positions of the two valves may be simultaneously or sequentially controlled such that the regeneration step is finished.

In particular, according to a preferred embodiment of the present disclosure, the first electronic control valve 31 and the second electronic control valve 35 may be 3-port 2-position valves, as in FIG. 1. For example, the first electronic control valve 31 may include a first port 32 connected to a compressor control outlet 51, a second port 33 connected to the second supply line 44, and a third port 34 connected to a vent 53. Further, the first electronic control valve 31 may have a first position where the first port 32 and the third port 34 are connected with each other and a second position where the first port 32 and the second port 33 are connected with each other. When power is not supplied, that is, the first electronic control valve 31 is turned off, as in FIG. 1, the first electronic control valve 31 is at the first position, and accordingly, the second supply line 44 is closed and the compressor control outlet 51 is connected to the vent 53. On the contrary, when power is supplied, that is, the first electronic control valve 31 is turned on, the first electronic control valve 31 is switched to the second position, and accordingly, the second supply line 44 is connected to the compressor control outlet 51 through the first electronic control valve 31. Accordingly, at the second position of the first electronic control valve 31, compressed air is transmitted to the compressor control outlet 51, and accordingly, the compressor can be changed into a driving state. That is, when control input is supplied to the compressor through the compressor control outlet 51, the compressor is changed into the driving state and can assist particularly a regeneration sequence valve in the system to open.

Further, according to a preferred embodiment of the present disclosure, the first port 32 of the first electronic control valve 31 diverges at the divergence point 56 of the line connected to the compressor control outlet 51 such that compressed air can be supplied to the regeneration sequence valve 16 of the regeneration line 45. Accordingly, when the first electronic control valve 31 is controlled to be switched to the second position, control input can be applied to the compressor control outlet 51 and the compressed air in the main supply line can be supplied to a first control input line 26 of the regeneration sequence valve 16. Further, the regeneration sequence valve 16 is connected to a second control input line 27 connected with the second electronic control valve 35. When the pressures of the compressed air that are applied through the two control input lines 26 and 27 reach a predetermined set pressure, the internal channel of the regeneration sequence valve is opened. In this regard, the electronic control valve 35 may also be a 3-port 2-position valve, similar to the first electronic control valve 31.

Similar to the first electronic control valve 31 described above, the second port 37 may be connected to the second supply line 44 and the third port 38 may be connected to the vent 53. Meanwhile, the first port 36 of the second electronic control valve 35 is transmitted as control input for controlling opening/closing of an unloading valve 13. Accordingly, as in FIG. 1, the first port 36 is connected to a control inlet of the unloading valve 13.

In this regard, the unloading valve 13 in the present disclosure is installed on the exhaust line 47, and may be for discharging compressed air to the atmosphere through the exhaust port 52.

For example, the unloading valve 13 may be configured to be pneumatically actuated by receiving a control input through the second electronic control valve 35 (a control input through the second control input 13*b*). In another example, it may be configured to be pneumatically actuated by receiving a control input through the first electronic control valve 31 (a control input through the first control input portion 13*a*) and a control input through the second electronic control valve 35 (a control input through the second control input portion 13*b*).

Accordingly, compressed air that has passed through the first electronic control valve 31 and/or the second electronic control valve 35 is applied to the control inlet of the unloading valve 13, whereby the unloading valve 13 is moved to a second position from a first position against the spring force of the unloading valve 13. The first position, as in FIG. 1, means the state an inlet port 13*d* diverging from the compressed air supply line 41 between the compressor and the filter cartridge 14 and an outlet port 13*e* connected to the exhaust outlet 52 are disconnected, and the second position means a valve position where two ports are connected to each other and the air in the compressed air supply line 41 can be discharged to the exhaust outlet 52.

Preferably, compressed air that has passed through the first electronic control valve may be applied to the first control input portion 13*a* of the unloading valve 13, and compressed air that has passed through the second electronic control valve 35 may be applied to the second control input portion 13*b*. As shown in FIG. 1, the first control input portion 13*b* is connected to the compressed air inlet 11 together with the compressed air supply line 41, and thus it may be configured so that compressed air discharged from the compressor is introduced through the compressed air inlet.

In the process of supplying compressed air, it is configured to be able to discharge air in the compressed air supply line 41 to the outside when the pressure of the compressed air supply line 41 exceeds a preset pressure. Accordingly, the unloading valve 13 can automatically open even if a pressure increase that is not allowable is generated, whereby it is possible to prevent overpressure in the compressed air supply line 41. In relation to this, the unloading valve 13 may be configured to open in accordance with the maximum supply pressure of the compressed air supply line 41.

In this regard, the unloading valve 13 includes a spring bias 13c provided by a spring member, and an initial spring force may be set in conjunction with a control input introduced through the first and/or second electronic control valves.

For example, the unloading valve remains closed in the initial position biased by a spring, and may be configured to be opened only when a pressure equal to or greater than the preset pressure is applied through the first control input portion 13a and/or the second control input portion 13b. Referring to FIG. 1, the unloading valve 13 is opened (moved from the first position to the second position) when the force of compressed air applied through the first control input portion 13a or the second control input portion 13b overcomes the spring force of the spring bias 13c. The first position, as in FIG. 1, means the state an inlet port 13d diverging from the compressed air supply line 41 between the compressor and the filter cartridge 14 and an outlet port 13e connected to the exhaust outlet 52 are disconnected, and the second position means a valve position where two ports 13d and 13e are connected to each other and the air in the compressed air supply line 41 can be discharged to the exhaust outlet 52. The unloading valve of FIG. 1 and related descriptions are intended to illustratively explain the operating principle of the unloading valve, and a detailed description of the unloading valve 13 and specific embodiments thereof will be described later.

Meanwhile, the compressed air flowing inside through the first port 36 of the second electronic control valve may be branched at the divergence point 58 and supplied to the second control input line 27. The second control input line 27 is another control input for connection to the regeneration sequence valve. Accordingly, when the second electronic control valve is controlled to be switched to the second position, the compressed air in the regeneration line is supplied to the second control input line through the second electronic control valve. Therefore, in a preferred embodiment of the present disclosure, compressed air may be supplied through two control input lines connected to the regeneration sequence valve, that is, the first control input line 26 and the second control input line 27.

In relation to this, the detailed structure of the regeneration sequence valve 16 is described. The regeneration sequence valve 16 includes a spring to close the internal channel in a normal state, and is configured to be able to open when the spring is pressed by the pressure of air flowing inside from the input side. The air that is supplied to the regeneration sequence valve 16 through the first control input line 26 and the second control input line 27 presses the spring, and pushes the spring such that the internal channel of the valve can be opened when it overcomes the spring force of the spring. For example, considering the pressure condition through the first control input line 26 and the condition of the second control input line 27, it is preferable that the regeneration sequence valve is set not to open when pressure is applied from only any one of the two input lines and to open only when pressure is applied from both of the two input lines. In this case, two electronic control valves may be simultaneously opened. More preferably, the lines may be controlled in two-stage control type such that pressure is applied through the first control input line 26 and compressed air primarily flows inside (that is, the first electronic control valve 31 is opened first) and then pressure is applied through the second control input line 27 (that is, the second electronic control valve 31 is opened later). In this case, the pressure of the regeneration sequence valve is increased step by step, so there is an effect that the durability of the valve can be improved.

Accordingly, when the set pressure of the regeneration sequence valve is reached and the internal channel of the valve is opened, compressed air that has passed through the first electronic control valve 31 and the second electronic control valve 35 can flows to the internal channel of the regeneration sequence valve through the first and second control input lines 26 and 27 and can be supplied to the regeneration line 45.

The opening conditions of the regeneration sequence valve are as follows. First, when the electronic control unit 21 controls the first electronic control valve 31 to switch and the compressed air in the main supply line 42 flows into the control line 48, some of the compressed air flowing in the control lien 48 is supplied to the regeneration sequence valve 16 through the first control input line 26. Meanwhile, the set pressure of the regeneration sequence valve 16 is set higher than the pressure of the air flowing inside through the control line 48, so the spring can be pressed and the internal channel of the valve can be opened only when the pressure that is applied to the regeneration sequence valve gradually increases and exceeds the set pressure. For example, when compressed air flows into the control input side of the regeneration sequence valve 16, the regeneration sequence valve 16 is not opened unless another control is performed.

In this case, when the second electronic control valve 35 is controlled to switch and the second control input line 27 is opened, pressure exceeding the set pressure of the regeneration sequence valve 16 is generated, so the regeneration sequence valve 16 is opened.

In relation to this, the regeneration sequence valve may have a structure in which predetermined pressure is maintained in accordance with the initial pressure level of compressed air and then the pressure in the valve is gradually increased up to the set pressure of the valve, whereby the channel in the valve can be opened. To this end, the set pressure of the regeneration sequence valve 16 is set higher than the pressure of the compressed air in the main supply channel, and preferably, the regeneration sequence valve 16 may be set to be open when a predetermined time passes after the first electronic control valve 31 is opened.

Accordingly, the regeneration sequence valve 16 is configured to be able to open the regeneration line 45 by control input of an electronic control valve, and preferably, may be a normally closed valve that is installed at the upstream side of the regeneration line 45.

Further, the regeneration sequence valve 16 is connected to the regeneration line 45 in which a regeneration check valve 17 is installed, and it flows back to the filter cartridge 14 through the regeneration line 45. The regeneration check valve 17, which is a component for preventing air in the regeneration line 45 from flowing backward, enables the compressed air that has passed through the filter cartridge 14 to be supplied only to the main check valve 15 without flowing backward through the regeneration line 45 in the supplying step. In the regeneration process, the air flowing back to the filter cartridge 14 flows to the compressed air supply line 41 and is discharged to the atmosphere through the exhaust outlet 52 after passing through the unloading valve 13. Further, a throttle 18 may be disposed on the regeneration line 45. The throttle 18 is a pipe decreasing the diameter of a portion of the regeneration line 45. Compressed air flowing into the filter cartridge 14 decreases in pressure while passing through the throttle 18.

In addition, the regeneration line 45 may optionally include a divergence point 55 and may be connected to a sep-cooler through a sep-cooler exhaust line 46 and a sep-cooler inlet port 54 that are connected to the divergence point 55. The sep-cooler is provided to filter out foreign substances such as oil contained in the air flowing into the compressor, and it can be selectively applied depending on the system configuration.

According to the embodiment of FIG. 1 in which the sep-cooler is installed, compressed air is supplied through the sep-cooler exhaust line 46 diverging between the regeneration check valve 17 and the regeneration sequence valve 16, and is then discharged through an exhaust port of the sep-cooler after passing through the inside of the sep-cooler. Accordingly, in the regeneration step, it is possible to discharge the foreign substances remaining in the sep-cooler while regenerating the filter cartridge 14.

Further, it is preferable that the second electronic control valve 35 is controlled by the electronic control unit 21 such that the unloading valve 13 is opened in advance before the regeneration sequence valve 16 opens the regeneration line 45. Accordingly, regeneration is performed with the compressed air in the compressed air supply line 41 sufficiently discharged, so the regeneration efficiency can be improved.

For example, the electronic control valve 21 can simultaneously control the first electronic control valve 31 and the second electronic control valve 35 to switch, whereby opening the unloading valve 13 and converting the compressor into the unloading state can be finished before the regeneration sequence valve 16 is opened.

Hereafter, the operation of the compressed air processing system according to the present disclosure is described with reference to FIG. 1 according to the first embodiment of the present disclosure.

First, FIG. 1 shows the situation in which compressed air is supplied with the first electronic control valve 31 and the second electronic control valve 35 at first positions, respectively.

Since both of the electronic control valves 31 and 35 are not operated yet, so the regeneration line is in an inactivated state in FIG. 1. In detail, when power is not supplied to the first electronic control valve 31, the first port 32 of the first electronic control valve 31 is connected with the vent 53 through the third port 34 and the pressure between the first port 32 and the regeneration sequence valve 16 does not reach the set pressure of the regeneration sequence valve 16, so the regeneration sequence valve 16 is closed, that is, the regeneration line 5 keeps closed by the regeneration sequence valve 16.

Meanwhile, when cartridge regeneration is required, the first and second electronic control valves 31 and 35 are simultaneously or sequentially opened, so the regeneration sequence valve 16 is opened and the compressed air in the main channel is supplied to the filter cartridge through the regeneration line, whereby regeneration is performed.

In an embodiment, the regeneration sequence valve 16 is configured such that when the air that has passed through the first electronic control valve 31 flows into the first control input line 26 of the regeneration sequence valve 16, the inflow air transmits pressure in a direction in which the spring 25 in the regeneration sequence valve 16 is compressed. Further, as the second electronic control valve 35 is controlled to switch to the second position, air flows inside through the second control input line 27 of the regeneration sequence valve 16, and similarly, transmits pressure in the direction in which the spring in the regeneration sequence valve 16 is compressed. If a preset operation pressure, that is, a set pressure of the regeneration sequence valve 16 is reached, a channel in the valve connected to the regeneration line 45 is formed while overcoming the restoring force of the spring. Accordingly, a delay is generated by the regeneration sequence valve 16 by the time until the set pressure is reached, so regeneration is performed with the unloading valve 13 opened first by the second electronic control valve 35.

A case in which two electronic control valves 31 and 35 are sequentially controlled is exemplified. First, when the first electronic control valve 31 is controlled to switch to the second position, control input is transmitted to the compressor control outlet 51 and simultaneously compressed air is also supplied to the first control input line 26 of the regeneration sequence valve 16. However, the pressure of the regeneration sequence valve 16 does not reach the set pressure, so the regeneration line 45 is not opened.

Thereafter, when the second electronic control valve 25 is opened and additional pressure is supplied through the second control input line 27, the pressure applied to the control pressure line 26 of the regeneration sequence valve 16 increases, so the set pressure is reached. Accordingly, the regeneration sequence valve 16 is opened and compressed air is supplied to the filter cartridge 14, whereby the regeneration step is performed. In this case, as the second electronic control valve is switched to the second position, the unloading valve 13 may already be in an open state.

According to a preferred embodiment of the present disclosure, as the second electronic control valve 35 is controlled to switch by the electronic control unit 21, it may be operated to open the unloading valve 13 first and then open the regeneration line 45 in accordance with a delay.

Meanwhile, the electronic control unit 21 may be configured to perform return control for maintaining the pressure in the system when regeneration is finished. The return control may be performed in a way of delaying the point in time at which the first electronic control valve returns to the first position. Preferably, when regeneration is finished, the second electronic control valve is returned to the first position by turning off the second electronic control valve 35, but the first electronic control valve 21 is maintained in the on-state, that is, maintained at the second position. In this case, the unloading valve 13 is closed again as the second electronic control valve 35 is closed, so discharge of compressed air through the compressed air supply line 41 is suppressed, whereby the internal pressure of the system can be quickly increased.

FIG. 2 is a cross-sectional view of an unloading valve assembly installed in a valve assembly to be connected to a filter cartridge according to a preferred embodiment of the present disclosure.

As shown in FIG. 2, the unloading valve assembly according to a preferred embodiment of the present disclosure may include a valve body 110 formed to allow compressed air to flow through two control valves, a piston 120 installed in an inner space of the valve body 110, a hollow adapter 130, a valve seat 140, a spring member, and a stopper 161.

As described in FIG. 1, a basic unloading valve assembly structure can configure pneumatic drives by using a first control input inputted through the first electronic control valve 31 and the second control input through the second electronic control valve 35.

In this regard, compressed air that has passed through the first electronic control valve may be applied to the first control input portion 13a of the unloading valve 13, and compressed air that has passed through the second electronic control valve 35 may be applied to the second control input portion 13b. Both the first electronic control valve and the second electronic control valve used in driving control of the unloading valve assembly according to a preferred embodiment of the present disclosure may be electronically controlled valves, or they may be mechanically controlled valves linked to limit pressure. Hereinafter, the first electronic control valve 31 and the second electronic control valve 35 are referred to as a first control valve and a second control valve, respectively.

The unloading valve assembly according to a preferred embodiment of the present disclosure may include the first control input portion 13a that receives the first control input of compressed air for valve opening according to the operation of the first control valve and the second control input portion 13b that receives the second control input of compressed air for valve opening according to the operation of the second control valve. This can be divided into a first pressurized region by compressed air flowing into an upper surface of the piston 120 to pressurize the piston 120 of the unloading valve described below and a second pressurized region by compressed air flowing into the hollow adapter 130 described below.

In addition, the unloading valve assembly according to the present disclosure may further include a first spring member 150 biased to correspond to the control input by the first control input portion 13a and the second control input unit 13b. Here, being biased means that the first spring member 150 is set to have a compressed initial position to provide a predetermined level of spring restoring force.

The unloading valve remains closed at an initial position biased by the spring member, and preferably, the amount of a spring bias may be set according to a pressure level of a control input provided through the first control valve and the second control valve, respectively, which are opened by interlocking a preset pressure value inside the system. In addition, a setting value of the spring bias 13c may be set according to the operation of opening the unloading valve in the compressed air processing system, and in this case, the control input by compressed air supplied from the compressor may also be considered.

Also, within the unloading valve assembly, the inlet port 13d and the outlet port 13e may be connected and formed so as to discharge inner compressed air to the outside, and according to a preferred embodiment of the present disclosure, the corresponding positions to the front and back of the closed position of the valve seat 140 may be described as the inlet port 13d and the outlet port 13e.

The unloading valve assembly according to a preferred embodiment of the present disclosure is configured to open and close the valve according to a pressure control condition of a system and to discharge compressed air to the outside air when the unloading valve is opened. To this end, the valve body 110 corresponding to the housing of the valve is provided, and the valve seat 140 for opening and closing the valve and the hollow adapter 130 may be accommodated inside the valve body 110. In addition, the valve seat 140 may include the piston 120 as a component for supplying a force separating from a contact portion forming the airtightness with the hollow adapter 130. As described above, the biased first spring member 150 supports the valve seat 140, and a cover 160 for supporting the spring member may be mounted on the valve body 110. The hollow adapter 130, the piston 120, and the cover 160 may form airtightness while sufficiently adhering to an inner circumferential surface of the valve body 110, and unlike the hollow adapter 130 and the cover 160 of which the movement is limited in the valve body 110, the piston 120 may be configured to slide inside the valve body 110.

Referring to FIG. 2, the unloading valve assembly may be connected to an inlet and an outlet of the filter cartridge, and may be configured to discharge compressed air through the inside of the unloading valve assembly. An outlet for discharging compressed air may be formed in a lower part of the unloading valve assembly. The example of FIG. 2 is an example of two outlets for discharging compressed air, which includes a bypass safety valve 180 for discharging compressed air with overpressure for a system protection when overpressure occurs in the valve assembly or in the unloading valve (e.g., more than 13.5 bar). However, the embodiment of FIG. 2 is only one example, and it is also possible to form a single outlet in the unloading valve assembly except the safety valve 180. In the example of FIG. 2, in addition to the main outlet 113 of the unloading valve assembly, a bypass outlet 114 is included for emergency discharge of compressed air when overpressure is formed inside the valve by bypassing the main outlet 113, and the compressed air can be configured to be discharged through the safety valve 180 formed at the bypass outlet 114.

Looking at each configuration included in the unloading valve assembly in more detail, the valve body 110 functions as a housing for inner components, and may be integrally formed, for example, in the valve assembly.

The example of FIG. 2 shows a cylindrical valve body 110 having a horizontal direction as an axis in the bottom of the filter cartridge, and may have a cylindrical inner space with a multi-stepped structure in an "axis direction (unless otherwise specified in this specification, the "axis direction" means a direction in which the piston 120 moves in a horizontal direction based on FIG. 2 and the first spring member is pressurized)," and may have a structure in which opposite ends in the axial direction are opened.

The multi-stepped structure of the valve body 110 may serve to limit the movement of the components accommodated in the valve body 110, that is, the cover 160, the hollow adapter 130, and the piston 120, through each step part having a step formed therein.

In addition, two inlet ports capable of introducing compressed air may be formed in the valve body 110 of the unloading valve assembly. A first inlet 111 in an upper part of FIG. 2 is meant to introduce compressed air through the first control valve into the valve, and is an inlet for compressed air discharged to the outside of the filter cartridge after regenerating a drying material while passing through the inside of the filter cartridge. Meanwhile, a second inlet 112 on the right side of FIG. 2 is an inlet for compressed air that flows through the second control valve to pressurize the piston 120 from the outside of the unloading valve assembly.

An adapter fixed in the valve body 110, the valve seat 140 installed in the adapter, and the first spring member 150 may be installed around the first inlet 111.

In addition, the piston 120 capable of sliding and moving in the valve body 110 by compressed air is installed around the second inlet 112.

The piston 120 may move forward and backward in the valve body 110 while forming an airtightness with the inner circumferential surface of the valve body 110, and may be configured to retreat the valve seat 140 in the axial direction, that is, to move the valve seat 140 in the left direction of FIG. 2, by pressurizing the valve seat 140 by compressed air through the second control input portion.

The piston 120 may include a piston head 121, a pressurizing rod 122 extending from the piston head 121 toward the valve seat 140, and a guide pin 123.

As shown in FIG. 2, a pressurizing groove 124 for compressed air corresponding to the second control input may be formed in one end of the piston head 121 so as to communicate with the second inlet 112 of the valve body 110.

In addition, the pressurizing rod 122 for pressuring the valve seat 140 is formed in the other end of the piston head 121, and the pressurizing rod 122 may have a sufficiently small radial (direction perpendicular to the axial direction) cross-sectional area compared to the piston head 121 so as to effectively retract the valve seat 140 using the force provided by the compressed air flowing from one end side of the piston head 121. In addition, the piston 120 may be configured to include the guide pin 123 extending from the pressurizing rod 122, and the guide pin 123 may be configured to be axially movable along the guide groove 141 inside the valve seat 140.

Meanwhile, the pressurizing groove 124 of the piston head 121 may be formed to have an inner diameter sufficiently smaller than an outer diameter of the piston head 121. In addition, in the initial state as shown in FIG. 2, the piston 120 may be configured to have an invalid stroke section in which only the piston 120 moves until the pressurizing rod 122 is in close contact with the valve seat 140 and retracts the valve seat 140.

Accordingly, in the initial state where the unloading valve device is closed, that is, when the valve seat 140 is in close contact with the hollow adapter 130 as shown in FIG. 2, as the compressed air corresponding to the second control input flows into the pressurizing groove 124, even if only the area of the pressurized groove 124 is initially pressurized, the piston 120 moves to the left in the axial direction at the time of pressing the valve seat 140. And, as shown in FIG. 3, the piston 120 may be pressurized with respect to a sufficient pressurized area, thereby maximizing a force for pushing the valve seat 140.

In addition, since the unloading valve is substantially opened when the movement of the piston 120 in the invalid stroke section ends, and the valve seat 140 and the pressurizing rod 122 of the piston 120 come into close contact, the amount of time delay for the opening of the unloading valve can be set appropriately by adjusting the invalid stroke amount. In addition, the valve seat 140 is located within the pressurizing section inside the hollow adapter, thus the spring coefficient of the first spring member 150 may be set sufficiently small. Accordingly, since the valve can be opened more quickly while adjusting the amount of time delay of the unloading valve, the opening timing of the unloading valve can be accurately controlled, thereby improving regeneration efficiency.

In addition, a first sealing member 171 is installed between the piston 120 and the valve body 110 to block the movement of the compressed air.

The valve seat 140 may be configured to move in the axial direction in the valve body 110 by the pressurizing rod 122 of the piston 120. To this end, the valve seat 140 may have a pressurizing rod settling surface 142 in contact with the pressurizing rod 122 and receiving a force by the pressurizing rod 122, and a valve seat groove and a gasket 174 inserted and fixed in the groove may be installed outside the settling surface to form airtightness when the valve is closed. In addition, a flange portion is formed in a radial direction of the valve seat 140, and the flange portion can be configured to prevent separation of the first spring member 150 and to pressurize the first spring member 150.

Meanwhile, one side of the valve body 110 may be completely closed by the cover 160. The cover 160 is fixedly mounted in the valve body 110, and may be fixed to the valve body 110 by screw coupling as shown in FIG. 2. The stopper 161 extending toward the valve seat 140 is formed in the cover 160, and the stopper 161 provides a limit for the valve seat 140 to retreat, thereby preventing the valve seat 140 from retracting while excessively compressing the first spring member 150. In addition, a second sealing member 173 may be inserted between the valve body 110 and the cover 160 to maintain airtightness between the two components.

When the valve is closed, the valve seat 140 is supported by the first spring member 150 while being separated from the stopper 161 by a predetermined distance. According to a preferred embodiment of the present invention, the valve seat 140 can move back and forth within the hollow adapter 130 while being guided only by the guide pin 123 of the piston 120. In addition, when the valve is closed, it is divided into the main outlet 113 connected to the outside air and the inner space of the hollow adapter 130 in which compressed air remains, with the gasket 174 of the valve seat 140 being the center.

The force applied on the valve seat 140 by the compressed air inside the valve body 110 may act as a force to close the valve. Accordingly, since the amount of the spring bias for closing the valve can be substantially reduced, deterioration in durability due to repeated opening and closing of the valve can be improved by setting the spring coefficient of the first spring member to be small.

When the valve is closed, the valve seat 140 is supported by the first spring member 150 while being spaced apart from the stopper 161 by a predetermined distance. According to a preferred embodiment of this invention, the valve seat (140) can be moved back and forth in the hollow adapter (130) while being guided only by the guide pin (123) of the piston (120). Also, when closing the valve, the main outlet (113) connected by outside air and the inner space of the hollow adapter (130) where compressed air remains based on the gasket (174) position of the valve seat (140), and the force of compressed air inside the valve body (110) can act as a force to close the valve. Therefore, since the size of the spring bias for closing the valve can be substantially reduced, the spring coefficient of the first spring member can be set to be small to improve the deterioration of durability due to repeated valve opening and closing.

The hollow adapter 130 is located in the center of the inner space of the valve body 110 of FIG. 2, and in a state in which the hollow adapter 130 is inserted and fixed in the inner space of the valve body 110, the unloading valve assembly may be opened and closed according to the contact with the valve seat 140 or releasing of the contact.

As shown in FIG. 2, the hollow adapter 130 has a hollow groove in the center and has a hollow cylindrical structure extending in the axial direction, and the valve seat 140, the spring member, and the stopper 161 of the cover 160 may be accommodated in the central hollow groove. In addition, a third sealing member 172 may be installed between the hollow adapter 130 and the valve body 110.

The hollow adapter 130 can be inserted into the multi-stepped valve body 110 and settled on the step part of the valve body 110 and pressurized and fixed into the valve body 110 by the cover 160. As shown in FIG. 2, with the assembling of the cover 160 to the valve body 110 in a state of fixing the hollow adapter 130 to the step part of the valve body 110, the cover 160 may be fixed into the valve body 110 while pressurizing the hollow adapter 130.

In addition, according to a preferred embodiment of the present disclosure, the hollow adapter 130 is a cylindrical member and is configured to include at least two openings at the side as well as to have openings formed on the upper and lower surfaces of the cylindrical structure. The first opening 131 near the first inlet 111 is provided to allow the compressed air passing through the first inlet 111 to flow into the hollow adapter 130, and the second opening 132 near the valve seat 140 is provided to discharge the air inside the hollow adapter 130 to the main outlet 113 through the second opening 132.

In addition, a third opening 133 near the safety valve 180 is provided such that the air inside the hollow adapter 130 may be discharged to the outside air through the bypass outlet 114. The third opening 133 near the safety valve 180 may be selectively installed, and the third opening 133 may not be included in an implementation in which the safety valve 180 is not installed, and thus the third opening 133 may be blocked.

Accordingly, the hollow adapter 130 may selectively provide various flow paths through which the compressed air can flow in the valve body 110 according to embodiments, and may selectively form a flow path of the bypass outlet 114 through the safety valve 180 in addition to the flow path to the main outlet 113 through a plurality of openings formed on the hollow adapter 130.

On the other hand, according to a preferred embodiment of the present disclosure, if overpressure exceeding the reference is formed in the valve assembly or the safety valve 180, a safety valve for mechanically releasing compressed air may be installed to prevent a pressure increase inside the valve and damage to components therefrom. Meanwhile, although the example of FIG. 2 shows an example in which the safety valve 180 is installed in a lower part of the valve body 110, installation of such a safety valve is not essential in the unloading valve assembly according to a preferred embodiment of the present disclosure. Therefore, the safety valve of FIG. 2 may be selectively installed, and for example, unlike FIG. 2, the safety valve may be configured to allow only the discharge of compressed air through the main outlet 113.

The safety valve 180 is connected to the bypass outlet 114 of the valve body 110 and may be a pressure interlocking mechanical valve. That is, as shown in FIG. 2, the safety valve 180 may has a structure including a safety valve seat 183 disposed in the safety valve body, a safety valve shaft 182, a second spring member 184, and a pressurizing socket 181 fixedly mounted on the safety valve body while pressurizing those components.

The safety valve seat 183 is mounted on the safety valve shaft 182 to open and close the bypass outlet 114, and may be fixed in the safety valve while being pressurized by the second spring member 184. The safety valve seat 183 may have a shape that can effectively block and open the bypass outlet 114, and preferably may have a rounded seat shape as shown in FIG. 2.

In addition, the pressurizing socket 181 is integrally fixed to the safety valve body, and as shown in FIG. 2, may be integrally assembled and fixed by screw coupling. The pressurizing socket 181 provides a supporting surface of the second spring member 184, and may have a hole formed in the center so as to guide the safety valve shaft 184. In addition, one or more safety valve exhaust ports 185 capable of discharging compressed air inside the safety valve to the outside may be formed.

A detailed operation of the unloading valve assembly having the above-described configuration will be described with reference to FIGS. 2 to 4 describing each operation state.

FIG. 2 shows a closed state of the unloading valve assembly, FIG. 3 shows an open state of the unloading valve assembly opened by valve control, and FIG. 4 shows a state in which the safety valve is opened when the internal pressure of the valve assembly increases above a reference pressure.

First, FIG. 2 shows a closed state of the unloading valve assembly, and when a control input by compressed air is not applied, the valve maintains a closed state as shown in FIG. 2, and the compressed air is not discharged to the outside.

Meanwhile, a state in which the valve is opened by applying a control input by the compressed air is shown in FIG. 3.

As the compressed air is introduced through the second inlet 112 of the valve body 110, the control input for pressurizing the piston 120 is applied. As the piston head 121 is pressurized by the compressed air at the second inlet 112 of the valve body 110, the piston 120 moves toward the valve seat 140, and the valve seat 140 may be opened as the pressurized rod 122 connected to the piston head 121 pushes the valve seat 140.

The guide pin 123 of the piston 120 is guided along the guide groove 141 of the valve seat 140, the pressurizing rod 122 is in close contact with the pressurizing rod settling surface 142 of the valve seat 140, and may supply a pressurizing force to the valve seat 140.

While the valve seat 140 is initially set by the first spring member 150 to close the inlet of the adapter, when the pressurizing rod 122 of the piston 120 pushes the pressurizing rod settling surface 142 of the valve seat 140, the valve seat 140 retreats slightly while compressing the first spring member 150. In this case, as the valve seat 140 is spaced apart from the hollow adapter 130, a fine gap is formed, and through this gap, high-pressure compressed air inside the valve body 110 rapidly escapes and is simultaneously discharged to the outside through the main outlet 113 of the valve body 110.

In this regard, in the first spring member 150, the spring coefficient of the first spring member 150 may be set to allow the valve seat 140 to retreat slightly by only the second control input, and accordingly, the unloading valve may be opened in advance without completely opening the regeneration line. In addition, if a second control input is also applied depending on whether the regeneration line is opened, the valve seat 140 may be completely retreated, and accordingly, the compressed air has been quickly discharged.

The compressed air remaining inside the valve body 110, especially in the hollow adapter 130, may be the air introduced through the first inlet 111, that is, compressed air containing moisture and oil used for regeneration through the filter cartridge, and such compressed air needs to be discharged to the outside. Since the flow path at the main outlet 113 communicates with the outside air, it is in an atmospheric pressure state. Accordingly, the high-pressure compressed air (e.g., 10 bar to 12 bar) that stayed inside the hollow adapter 130 with the valve seat 140 closed may be quickly discharged to the outside air through the main outlet 113 as soon as the piston 120 pushes the valve seat 140 to open the second opening 132 of the adapter. In this case, the flow of the compressed air discharged to the main outlet 113 further provides the first control input for compressing the spring through an opening surface of the valve seat 140, and the valve seat 140 can be completely retracted by a combined force with the second control input compressing the piston 120 to achieve a fully-opened state of the unloading valve. Accordingly, by sufficiently decreasing a biased initial spring force of the first spring member 150 of the unloading valve device, the unloading operation for discharging compressed air can be implemented only by retracting the piston 120 by the second control input introduced through the second inlet 112. Therefore, the problem of damage to the piston 120, the valve seat 140, etc., by repeated driving due to strong spring restoring force, may be solved.

The valve seat 140 may be retracted until the movement is limited by the stopper 161 of the cover 160, and when the compressed air inside the valve assembly is sufficiently discharged and the inner pressure decreases below the reference pressure with respect to the restoring force of the first spring member 150 (e.g., set to 7 bar to 8 bar), the valve seat 140 and the piston 120 may be set to return to an original position as shown in FIG. 2.

Meanwhile, according to a preferred embodiment of the present disclosure, the bottom of the unloading valve assembly may further include a structure in which the safety valve is installed vertically to discharge compressed air in an emergency, and the operating state of the safety valve is described in FIG. 4.

First, in FIG. 2, which shows the closed state of the unloading valve assembly, the safety valve is also in a closed state. In the closed state of the safety valve, the bypass outlet 114 is closed by the safety valve seat 183.

On the other hand, the second spring in the safety valve may be configured to be opened at a preset reference pressure (e.g., a pressure greater than or equal to 13.5 bar), and when overpressure above the reference pressure is generated within the valve, the high-pressure compressed air is pressurized on the upper surface of the safety valve seat 183 through the bypass outlet 114. Accordingly, the safety valve seat 183 and the safety valve shaft 182 descend, and the safety valve exhaust port 185 may be opened as shown in FIG. 4. Accordingly, when the pressure inside the valve increases above the reference pressure, the compressed air may be discharged to the outside through the safety valve exhaust port 185 by bypassing the main outlet 113.

The safety valve may be suitable for an example including electrically controlled control valves, and the valve may be mechanically opened at a pressure of a certain level or higher even if the valve is not electrically controlled. Therefore, it is possible to effectively prevent a valve damage problem due to overpressure inside the valve.

In addition, according to a preferred embodiment of the present disclosure, since a safety valve function for discharging compressed air of overpressure above the reference pressure is be separated as a separate safety valve, only the spring force of the second spring member 184 of the safety valve can be set sufficiently large. That is, the bias amount of the first spring member 150 may be set small enough to open the valve by the control input of the compressed air. Accordingly, it is possible to effectively prevent the valve from being damaged even by repeated operation of the main unloading valve, which has a much higher number of operations than the safety valve.

FIGS. 5 and 6 are cross-sectional views of an unloading valve assembly according to another embodiment of the present disclosure.

First, in the case of FIG. 5, the unloading valve assembly to which the valve seat and valve shaft structure of the safety valve described above are applied to the main valve is illustrated.

The example of FIG. 5 has substantially the same structure as the example of FIG. 2, except the valve seat (including the seat portion and the valve shaft). However, the valve seat 740 in FIG. 5 replaces the entire valve seat and gasket in FIG. 2, and specifically, the seat portion made of a material capable of airtight, such as rubber, may be made of an elastic member with a round contact surface with the hollow adapter 730. The shape of the seat portion may be formed in various shapes including a rounded seat surface (contact surface). For example, as shown in FIG. 5, the seat portion may be pressurized against a first support surface for supporting the first spring member 750 and the piston 720, and includes a second support surface parallel to the first support surface. Furthermore, the seat portion may have a structure including a rounded seat surface connected from the first support surface to the second support surface, and the shapes of the first and second support surfaces and the seat surfaces may be appropriately changed.

Since the structure has been changed to include the main valve shaft capable of sliding in the axial direction inside the valve seat and the hollow adapter 730, such a change in the structure of the valve seat allows only changes to some components.

That is, in the example of FIG. 5, unlike in FIG. 2, a guide groove for guiding the main valve shaft is formed in the center of the stopper of the cover 760. In addition, the hollow adapter 730 may have the shape of a seat settling surface corresponding to the surface shape of the seat portion according to the rounded shape of the valve seat that forms a relatively large contact area.

In addition, although not described separately in FIG. 5, a safety valve may be further included in a bottom of the valve body 710.

Meanwhile, FIG. 6 is a cross-sectional view of the unloading valve assembly according to another embodiment of the present disclosure. In FIG. 6, a basic structure including the valve body 810 is the same as in FIG. 5, but FIG. 6 has a difference from FIG. 5 in that a spherical seat portion 840 has been applied to form a rounded seat surface. The spherical seat portion may form an airtightness with the hollow adapter 830, and the main valve shaft may retreat by interlocking the operation of the piston 820. FIG. 6 is the same as described above in that the unloading valve is opened while compressing the second spring member 850 according to the retreat operation of the main valve shaft. Accordingly, the spherical seat portion may also be configured to operate integrally with the main valve shaft, and the main valve shaft may be guided while sliding forward and backward through the guide groove of the cover 860. In addition, the seat settling surface of the hollow adapter 830 may be formed according to the shape of the spherical seat portion, and may be, for example, a curved seat settling surface having a curvature corresponding to the curvature of the spherical seat portion. On the other hand, in FIG. 6, an example in which the seat settling surface is formed with a curved surface having a relatively large radius of curvature as compared to the spherical seat portion is illustrated. The curvature of the seat settling surface may be appropriately designed to set sufficient airtightness with the seat portion.

On the other hand, in the examples of FIGS. 5 and 6, a contact surface between the valve seat and the adapter may be curved compared to the example of FIG. 2. Accordingly, it is possible to prevent failure of the unloading valve assembly caused by abrasion at the valve seat during the repeated operation of the unloading valve assembly, thereby improving durability of the valve.

Since the other configurations of FIGS. 5 and 6 and the valve opening/closing operation are substantially the same as those of FIG. 2, a description related thereto will be replaced with the description of FIG. 2.

INDUSTRIAL APPLICABILITY

The present disclosure was described above on the basis of embodiments and the accompanying drawings. However, the range of the present disclosure is not limited by the embodiments and drawings and may be limited only by claims to be described below.

The invention claimed is:

1. An unloading valve assembly for compressed air processing system in a commercial vehicle, comprising:
    a valve body having an inner space extending in an axial direction, and including a first inlet through which a first control input of compressed air is introduced according to an operation of a first control valve, a second inlet through which a second control input of compressed air is introduced according to an operation of a second control valve, and a main outlet through which the compressed air of the inner space between the first inlet and the second inlet can be discharged to the outside;
    a piston including a piston head configured to receive the second control input by compressed air introduced from the second inlet and a pressurizing rod extending from the piston head in the axial direction and having an outer diameter smaller than that of the piston head, wherein the piston is inserted into the inner space of the valve body and configured to communicate with the second inlet to be axially movable by the second control input;
    a hollow adapter inserted and fixed into the inner space of the valve body, including a first opening communicating with the first inlet and a second opening through which a part of the piston can pass, and having a valve seat settling surface formed thereon;
    a valve seat installed inside the hollow adapter to open the second opening of the hollow adapter while being pressurized by the piston and guided in the axial direction, wherein the valve seat further includes a pressurizing rod settling surface capable of being in contact with the pressurizing rod of the piston, the valve seat forms an airtightness with the valve seat settling surface of the hollow adapter outside of the pressurizing rod settling surface;
    a cover fixed to the valve body; and
    a first spring member compressibly installed between the cover and the valve seat.

2. The unloading valve assembly for compressed air processing system in a commercial vehicle of claim 1, wherein the pressurizing rod of the piston is initially spaced apart from the pressurizing rod settling surface of the valve seat, and is configured to have an invalid stroke section in which only the piston moves until the pressurizing rod comes into close contact with the pressurizing rod settling surface,
    wherein the pressurizing rod is configured to pressurize the valve seat in the direction in which the valve seat is opened at the main outlet side.

3. The unloading valve assembly for compressed air processing system in a commercial vehicle of claim 2, wherein the piston head is provided with a pressurizing groove communicating with the second inlet, and an inner diameter of the pressurizing groove is smaller than an outer diameter of the piston head,
    wherein the piston retracts in the axial direction as the second control input is applied to the pressurizing groove, and the entire end surface of the piston head is pressurized by the second control input, when the valve seat is pressurized to open the second opening of the hollow adapter, the compressed air introduced into the inner space of the valve seat through the first inlet is discharged to the main outlet.

4. The unloading valve assembly for compressed air processing system in a commercial vehicle of claim 1, wherein the cover further includes a stopper into which the first spring member is inserted and which protrudes toward the valve seat so as to limit the amount of retreat of the valve seat.

5. The unloading valve assembly for compressed air processing system in a commercial vehicle of claim 1, wherein the inner space of the valve body has a multi-stepped structure with a step part, and
    the hollow adapter is fixed between the cover and the step part of the valve body.

6. The unloading valve assembly for compressed air processing system in a commercial vehicle of claim 2, wherein the piston further includes a guide pin extending in the axial direction from the pressurizing rod, and
    the valve seat further includes a guide groove extending from the pressurizing rod settling surface and guiding the guide pin until the pressure rod comes into close contact with the pressurizing rod settling surface.

7. The unloading valve assembly for compressed air processing system in a commercial vehicle of claim 1, wherein the valve body is provided with a bypass outlet through which compressed air introduced into the first inlet can be discharged without passing through the main outlet,
    the hollow adapter has a third opening formed to communicate with the bypass outlet, and
    a safety valve is further installed to open and close the bypass outlet.

8. The unloading valve assembly for compressed air processing system in a commercial vehicle of claim 7, wherein the safety valve includes:
    a safety valve seat capable of blocking the bypass outlet;
    a safety valve shaft connected to the safety valve seat;
    a pressurizing socket fixedly mounted in the valve body, configured to guide the safety valve shaft, and having an exhaust port formed therein; and
    a second spring member compressibly installed between the pressurizing socket and the safety valve seat,
    wherein the safety valve is opened when the pressure in the inner space of the valve body exceeds a preset reference pressure.

9. The unloading valve assembly for compressed air processing system in a commercial vehicle of claim 1, wherein the valve seat includes a main valve shaft and a seat portion having a rounded seat surface fixed and mounted on the main valve shaft,
    a stopper having a groove formed to guide the main valve shaft is formed in the cover, and
    the valve seat settling surface of the hollow adapter is rounded in accordance with the seat surface.

10. The unloading valve assembly for compressed air processing system in a commercial vehicle of claim 9, wherein the seat portion includes:
    a first support surface configured to support the first spring member;

a second support surface which can be pressurized against the piston; and a rounded seat surface connected from the first support surface to the second support surface.

11. The unloading valve assembly for compressed air processing system in a commercial vehicle of claim 10, wherein the seat portion is a spherical seat portion.

\* \* \* \* \*